June 6, 1967 G. DAUBRESSE ETAL 3,323,354

ULTRASONIC TESTING APPARATUS

Filed March 12, 1964 5 Sheets-Sheet 1

INVENTORS
Guy Daubresse
Bernard Froman
Jean Jordi

BY ATTORNEY

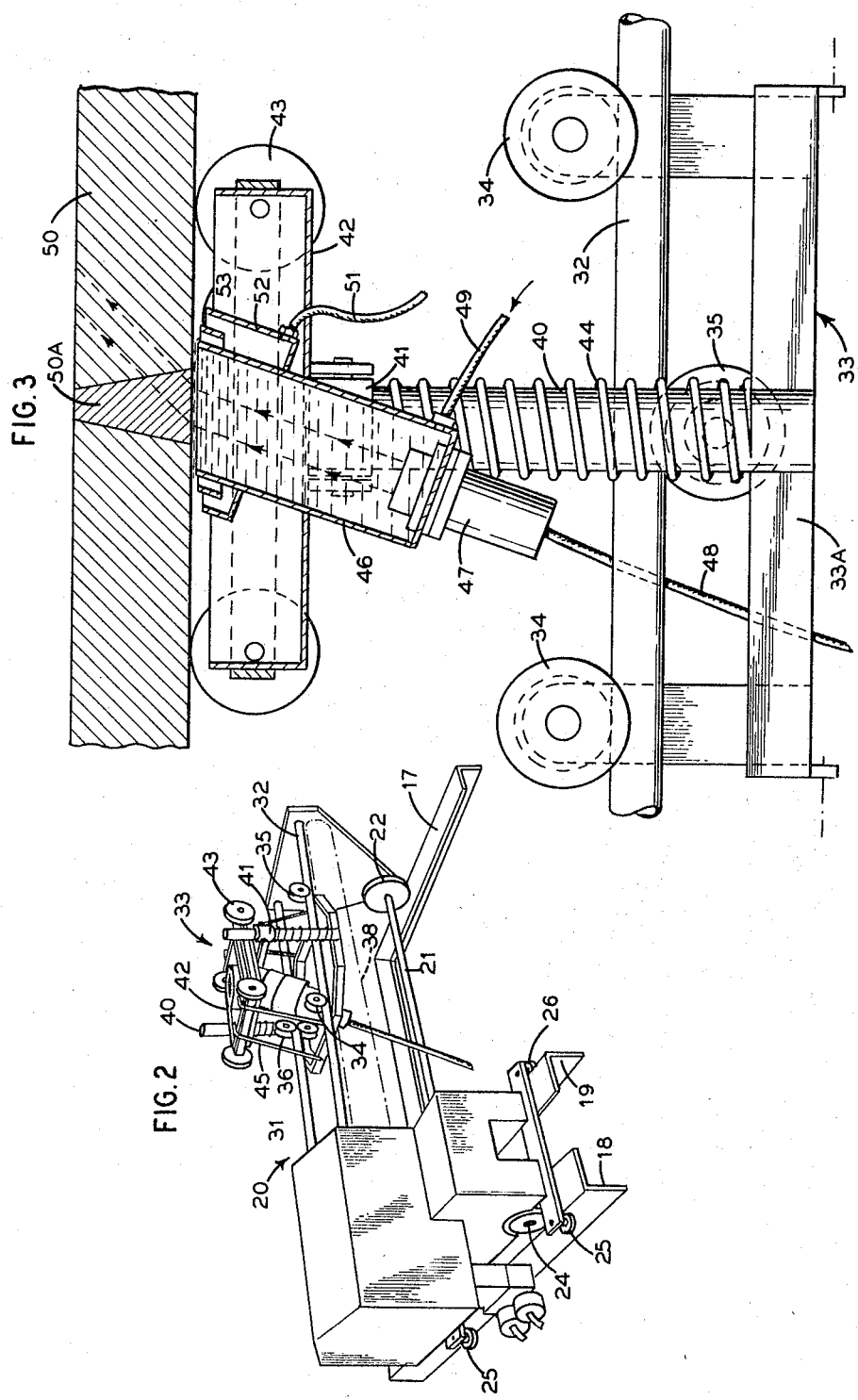

FIG. 6A
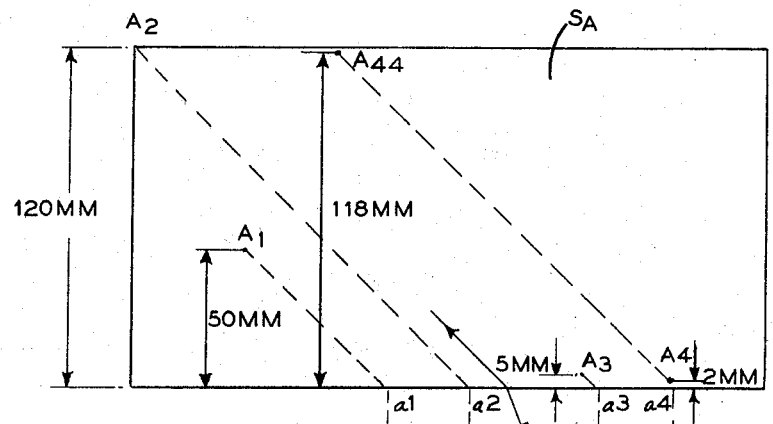
FIG. 6C
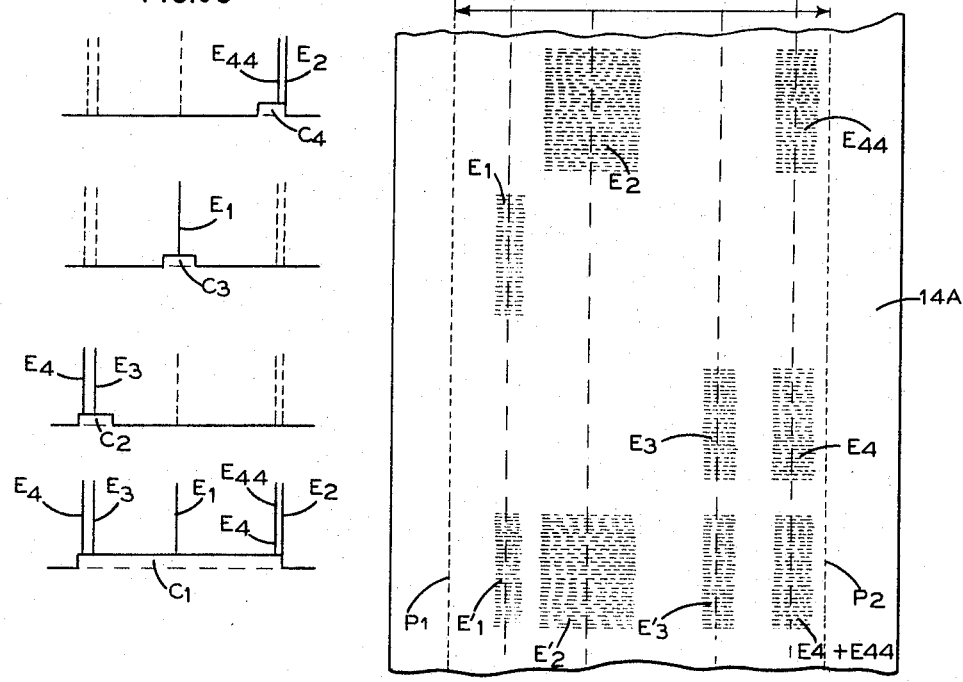
FIG. 6B

FIG. 7B
FIG. 7A
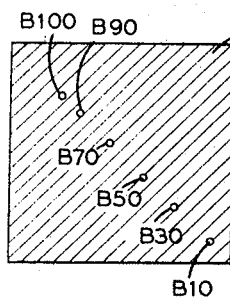
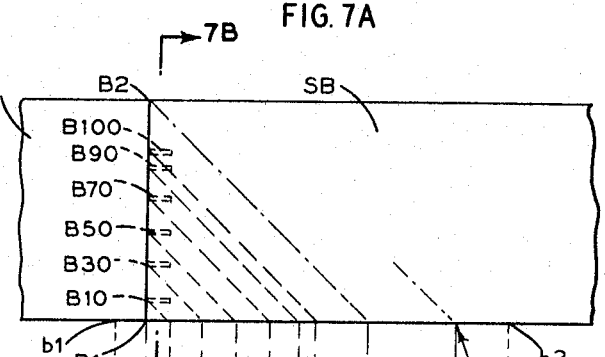
FIG. 7C
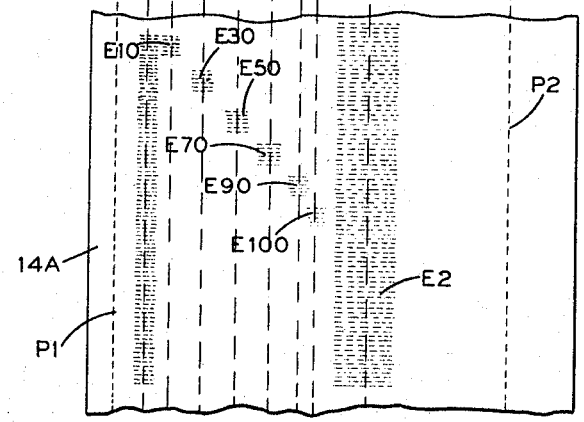

United States Patent Office 3,323,354
Patented June 6, 1967

3,323,354
ULTRASONIC TESTING APPARATUS
Guy Daubresse, Deuil-La Barre, and Bernard Froman and Jean Jordi, Paris, France, assignors to Babcock & Wilcox, Limited, London, England, a corporation of Great Britain
Filed Mar. 12, 1964, Ser. No. 351,342
Claims priority, application France, Mar. 14, 1963, 927,973, Patent 1,359,314
13 Claims. (Cl. 73—67.8)

The present invention generally relates to ultrasonic flaw detection, and more particularly to apparatus for the detection of flaws or defects in welds connecting plates of any thickness.

Manual scanning techniques are normally employed in the ultrasonic testing of welds, whereby the operator moves a probe over the surface of the workpiece being tested. The probe passes ultrasonic signals into the workpiece and may be positioned for ultrasonic beam transfer into the workpiece normally to the workpiece surface, but more frequently it is arranged so that the direct or reflected part of the emitted beam sweeps the whole of the volume of the weld being tested. The probe means normally also receives ultrasonic waves that may by flaws be reflected back along the same or similar path. The probe normally has a solid sole or contact face which has to be applied as correctly as possible to the surface of the workpiece. It is also normally necessary that the explored surface of the workpiece should be well polished and that a thin film of oil, which the operator must renew frequently, be kept on the surface to insure continuity of contact and consequently reliable results. In addition, the operator must constantly watch the screen of the transmitting-receiving appliance, and note the echos or responses produced by possible flaws or obstacles in the workpiece. It is additionally necessary that the operator give sufficient attention to his manual movements of the probe so that he does not leave any part of the weld unexplored.

The above described technique is generally inadequate particularly as regards workpieces of great thickness, for several reasons. When the contact face of the probe is in direct contact with the workpiece, parasite or secondary oscillations are frequently produced which prolong the duration of the emission impulse and correspond, on the oscilloscope viewing screen, which is marked in distance, to a dead zone in which flaws may pass undetected. This dead zone, the depth of which depends on variations in the effective contact between the probe and the workpiece, normally includes the first ten to twenty millimeters of the workpiece thickness. Also, the sensitivity of flaw detection is subject to fluctuations caused by the inconsistent degree of contact between the probe and the workpiece.

Mechanization of scanning presents difficult problems, particularly due to the aggravations of the variations in contact conditions due to the amplitude and rapidity of any systematic mechanical sweeping or scanning movement, so that it is difficult to obtain a true and significant record of the location of any flaws or defects.

One object of the present invention is therefore to provide a special checking or scanning technique and the apparatus necessary to automatically apply this technique, thus insuring excellent detection of faults in the whole thickness of the workpiece through perfect constancy of sensitivity of contact. Another object is to provide for supplying an inspection record of an ultrasonic examination of a longitudinally extended region of a workpiece which will show immediately whether and if so where flaws may be present in the region examined.

This invention includes a probe offering the technical advantages of immersion methods without the disadvantages normally associated with total immersion of the workpiece in a tank. In accordance with the invention, the probe intended to be placed under the workpiece comprises a transmitting-receiving crystal which emits a beam through a column of liquid in contact with the workpiece. Where the liquid used is, for example, water, if the axis of the beam is inclined at an angle of about 19° in relation to an imaginary axis normal to the workpiece (assumed to be steel), the refracted beam on entering the plate (transverse waves) will have an inclination of about 45°. When the emitted beam encounters an obstacle, it is, as in the usual techniques, partially or totally reflected, and the reflected beam follows the inverse path back to the crystal. The return of the reflected beam to the crystal is then electrically translated into a signal which appears on the screen of the oscilloscope of the transmitting-receiving appliance. In accordance with the usual technique, the beam consists of a continuous series of isolated group of pulses or waves.

The maintenance on the workpiece of a column of liquid which is stable and without discontinuity, even when the probe moves, is one of the main aspects of the present invention. The liquid is supplied at low pressure to a cylindrical chamber which surrounds the crystal. The chamber has its upper end beveled so that it is parallel to the plane of the workpiece when the axis of the chamber is tilted the proper amount (19° when the liquid in the column is water). The upper end of the chamber is held at a distance from the plate sufficiently small so that the liquid is allowed by capillarity to form a meniscus at the top of the chamber in contact with the workpiece. When water is used as the liquid, the height of the meniscus may be as much as 4 or 5 millimeters, so that the upper end of the chamber wall must be maintained within this distance from the workpiece surface. The excess of liquid flowing over the end of the chamber wall is collected in a trough to be recovered and recirculated. By having the chamber end displaced from the workpiece surface, it is possible to explore a workpiece having a very irregular surface.

It should be recognized that the above described liquid contact system may be designed so as to accommodate multiple transmitting and receiving crystals sending out complementary beams without departing from the spirit of the invention.

This invention also covers the particular application of a probe of the type described to the automatic checking of the connecting welds of thick plates and the corresponding possibilities of registration, i.e., making a record of the faults or flaws detected during the course of an automatic check of the workpiece.

One form of automatic scanning included within the scope of the invention is carried out by means of a double movement of the probe which is somewhat similar to that attempted in the usual manual scanning techniques. The movements of the probe consist of an alternating sweeping movement perpendicular to the axis of the weld being investigated, and a slow movement parallel to the axis of the weld, the latter movement being synchronized with the former. The probe thus describes a rocking movement progressing in the direction of the axis of the weld. The longitudinal advance is preferably affected at the end of the transverse run, i.e., at each semi-alteration, so that the sweeping pitch, having regard to the width of the emitted beam, may keep a fixed value at all points in the zone involved.

The testing and flaw detection apparatus discussed above is advantageously associated with a registering or recording device adapted to establish a map of the echoes obtained from the search probe by showing the position of the probe for which an echo or response is obtained. To do this, a recording pen or marker reproduces, on a piece of paper, movements similar to the sweeping movement which is effected by the probe carrying mechanism. The recording paper may be of the electro-sensitive type or any comparable type on which an impression or mark is made by the marker when an echo, selected as a function of conditions regulated in advance (amplitude, position, depth, etc.), is received from the probe.

Of particular note, as regards the registration of echos, is the fact that each line traced by the marker on the paper and representing an obstacle in the metal is made up of a plurality of closely spaced points, each of which corresponds to an echo from the flaw detected. The frequency of inscription of points therefore is the same as the frequency of emission of the groups ultrasonic waves or pulses from the probe. Thus, it can be seen, that the recording system herein described is not burdened with an electrical or mechanical inertia as are most systems.

The various features of novelty which characterize the invention are pointed out with particularity in the claims annexed to and forming a part of the specification. For a better understanding of the invention, its operating advantages and specific objects attained by its use, reference should be had to the accompanying drawings and descriptive matter in which there is illustrated and described a preferred embodiment of the invention.

In the drawings:

FIGURE 2 is a detailed perspective view of the probe-moving mechanism;

FIGURE 3 is a sectional view of the search probe in operative position relative to a workpiece being inspected;

FIGURE 6A is a test block used for demonstrating operation of the disclosed invention;

FIGURE 6B is a diagram of a portion of recording paper showing the marks produced in testing the test block of FIGURE 6A;

FIGURE 6C is a diagram of the views on an oscilloscope screen corresponding to the marks on the paper of FIGURE 6B;

FIGURE 7A is a different test block (from the one shown in FIGURE 6A);

FIGURE 7B is a sectional view of the test block taken along line 7B—7B of FIGURE 7A;

FIGURE 7C is a diagram of a portion of recording paper showing the marks produced in testing the test block of FIGURES 7A and 7B.

Figure 1:
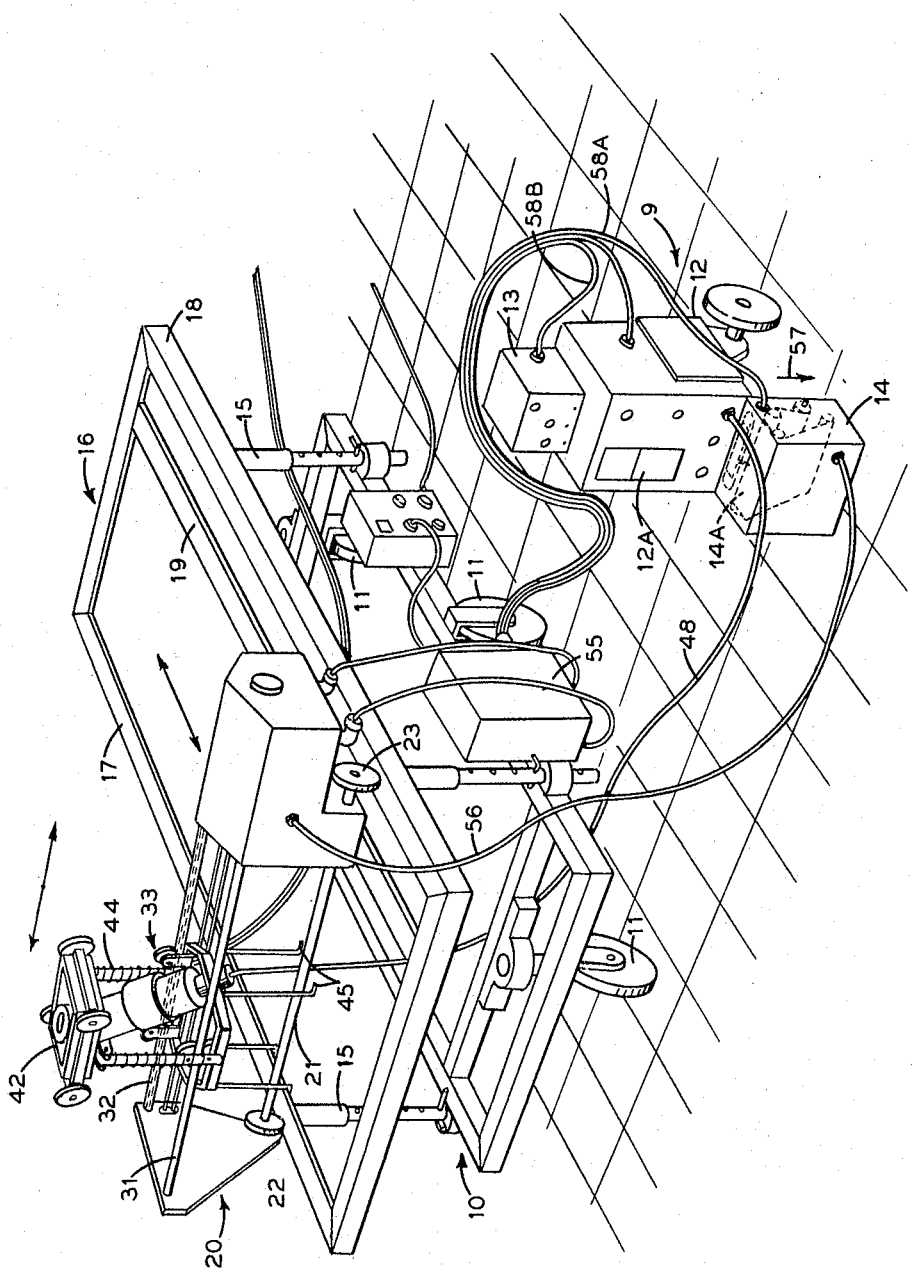
FIGURE 1 is a diagrammatic perspective view of an ultrasonic testing apparatus in accordance with the present invention.

In accordance with the form of the invention shown in FIGURES 1, 2 and 3, a transporting carriage 10 mounted on wheels 11, is adapted to carry the entire testing apparatus, except for an ultrasonic transmitter-receiver 12, a monitor 13 for the selection of the echos, and a recorder or registering appliance 14 which have been placed on a separate mobile carriage 9.

The transmitter-receiver 12, with its oscilloscope checking screen 12A, is of the usual type having provisions for correction of the amplification of responses as a function of echo delay and thus as a function of the depth of a flaw in the workpiece, whereby similar flaws at different depths may result in the same strength of amplified response in spite of the alternation of ultrasonic waves in the workpiece metal.

The echo-selecting monitor 13, which is operatively associated with the transmitter-receiver 12, is utilized to select the echos or responses which it is desired to record or register. The monitor 13, sends out an electrical signal when the following two conditions are realized: the echo exceeds a certain predetermined amplitude, and the echo is within a certain predetermined time interval in relation to the ultrasonic emissions.

The carriage 10 includes a frame 16 carried on columns 15 of adjustable height, the frame 16 forming, with its two angle-iron sides 17 and 18 and an intermediate parallel angle-iron bar 19, a set of longitudinal tracks for the sweeping carriage 20. The carriage 20, shown in FIGURE 2, is supported at the rear by a carrying axle 21 with wheels 22 and 23 engaging on the sides 17 and 18 respectively of the frame 16, and in front by a driving axle (not shown) engaging side 18 of the frame 16 and bar 19. In addition, the carriage 20 is guided in the lateral direction by two pairs of rollers 25 and 26 having a vertical axis and being adapted to engage with and roll on the vertical legs of the angle irons 18 and 19.

The transversely extending bars 31 and 32 of the carriage 20 form a track for the probe-carrying carriage 33 which includes a polygonal frame 33A, guided by rollers 36 on the bar 31. The carriage 33 is connected by a chain indicated at 38 to a reversible electrical motor (not shown) adapted to drive the carriage 33 at a substantially constant velocity, alternately in one direction and then in the other, between two end-of-run stops (not shown) which are adjustable at will. The carriage 20 is also equipped with a second drive motor (not shown) acting on the driving axle 24 so that the carriage 20 is afforded an advancing movement of predetermined amplitude on the longitudinal tracks (sides 17 and 18 and bar 19) at each inversion of operation of the transverse sweeping movement of the carriage 33 effected along bars 31 and 32.

The probe-carrying carriage 33 comprises two vertical columns 40 on which is mounted, freely sliding by means of sleeves 41, a rectangular dish-shaped frame 42 with four wheels 43 which engage the workpiece 50. Helical springs 44, engaging with the lower ends of sleeves 41, tend to force the frame 42 upwards, while a set of stop-rods 45 may be moved from the positions shown in FIG. 1 to the positions shown in FIG. 2 in order to limit the upward movement of the frame 42 with this provision the apparatus may be maneuvered under the workpiece before operation, and the stop-rods 45 returned to the positions shown in FIG. 1 when the apparatus is to be operated. A cylindrical tube 46 is affixed in the middle of the frame 42 and forms an elongated cylindrical chamber containing liquid. The axis of the tube 46 is inclined with respect to the vertical at an angle (of approximately 19° when the liquid used is water), and the upper end of the tube 46 is beveled, so as to be substantially parallel to the plane of the surface of the workpiece 50 which is being inspected.

A relative position in height of the tube 46 in the frame 42 is established so that the upper beveled end of the tube 46 is displaced slightly from and parallel to the horizontal plane of the workpiece 50 tangential to the wheels 43. In other words, as shown in FIGURE 3, when the wheels 43 of the frame 42 come into contact with the workpiece 50, the upper beveled end of the tube 46 is spaced at a given distance (1–4 mm. when the liquid used is water) from the workpiece. It should be noted that the maximum distance is established by the ability of the liquid being used to form, by capillarity, a meniscus whereby the liquid column in the tube 46 extends above the top edge of the tube and is in contact with the workpiece 50.

In the center of the bottom of the cylindrical chamber formed by the tube 46 is mounted an immersed probe 47 with a transmitting-receiving crystal directed along the axis of the tube 46 and connected by a flexible cable 48 to the transmitter-receiver 12. A flexible tube 49, supplied from a source of low pressure liquid, is attached near the base of the tube 46. The upper end of the tube 46 is suitably fitted with a circumferentially arranged trough 52 having a drain line 51 connected thereto. A flow detecting ring 53 is circumferentially arranged between the upper end of the tube 46 and the trough 52.

A control box 55 is mounted on the carriage 10 and contains the necessary electrical equipment for performing the following electronics functions: amplification of the signal selected by the monitor 13; if desired, automatic stopping of the sweeping movement of the probe 47 upon the detection of a fault or defect; and electrical operation of the recorder 14 to coincide with corresponding movements of the carriage 33. The recorder 14 is preferably of the type utilizing electrosensitive registration adapted to be effected by a marker or pen (not shown) which is driven by means of a coupling 56 in a transverse sweeping movement (across the recording paper 14A) so as to be synchronized with the transverse movements of the probe-carrying carriage 33. The recording paper 14A is advanced in the direction of the arrow 57 by a signal synchronized with the advancements of the carriage 20 along the length of the frame 16. Thus for each transverse sweep of the carriage 33 the recording pen makes a corresponding sweep across the recording paper 14A, while for each advancement of the carriage 20 along the frame 16, the paper 14A is correspondingly longitudinally advanced. The recording pen is connected electronically to the control box 55 by a cable 58A so that the pen makes a mark on the paper 14A upon each emission of a signal by the monitor 13, the monitor 13 being connected to the control box 55 by a cable 58B.

It should be recognized that other types of recorders, for example those employing ink marking means normally held off the paper but allowed to contact the paper momentarily when a suitable echo is received, may be utilized without departing from the spirit of the invention.

The above described equipment is particularly adapted to the automatic testing of longitudinal or circumferential welds in thick plates or drums. The equipment forms an assembly totally independent of the workpiece; moreover, it can easily be transported and placed in position under a workpiece. The adjustable height feature of the carriage 10, effected by the columns 15, makes it possible to place the longitudinally extending frame 16 at any suitable height under the workpiece parallel to the weld to be inspected.

Having thus placed the carriage 33 under the workpiece 50, as shown for example in FIGURE 3, a sufficient upflow of liquid is established in the tube 46 to effect and maintain a stable column of liquid between the probe 47 and the workpiece 50. The meniscus thus formed between the upper end of the tube 46 and the workpiece 50 allows the testing of irregular surfaces at speeds up to approximately 40 cm./sec. The excess of liquid flows into the trough 52 to be recovered and recirculated. A deflectory ring 53 stops the drops of liquid which, by capillarity, would have a tendency to travel along the workpiece 50 and escape recovery.

The dimensions and internal lining of the tube 46 are selected so as to prevent the formation of parasite or secondary ultrasonic signals. Thus, when water is used as the liquid, the height of the water should be greater than the thickness of the workpiece 50 being examined, after taking into account the greater velocity of sound in metal as compared to water, as well as the beam angles shown in FIG. 3.

Using water as the liquid, since the angle of incidence of the beam of waves issuing from the probe 47 is 19°, the refracted beam will enter the workpiece 50 with an inclination of approximately 45°. When it encounters an obstacle or flaw, it is, in a manner well known, partially or totally reflected, the reflected beam following an inverse path back to the crystal of the probe 47. The reflected beam, representative of an obstacle in the workpiece 50, causes a signal to appear on the screen 12A of the oscilloscope of the transmitter-receiver 12.

Figure 4:
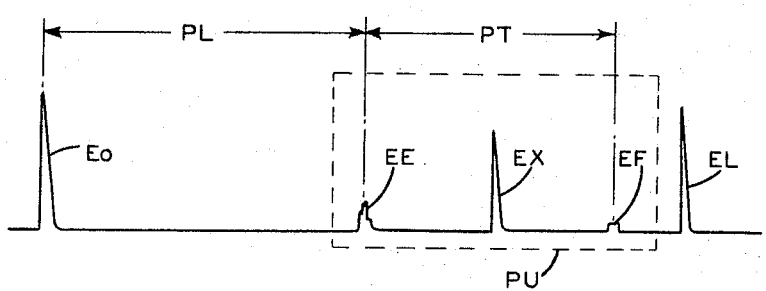
FIGURE 4 is a diagram showing the forms of oscilloscope indications normally experienced in the operation of the disclosed ultrasonic testing apparatus.

FIGURE 4 shows a typical set of signals which may be observed on the screen 12A which is generally indexed in the lateral direction in terms of distance. The "pip" or echo E0 represents the reflection of a portion of the emitted beam from the crystal into the water column in the tube 46, and is followed by a zone PL without disturbance which corresponds to the path of the wave in the column of liquid. Two successive similar "pips" EE and EF respectively represent reflections from the surface of the workpiece in contact with the liquid column and the opposite surface of the workpiece; the height of these "pips" being representative of the irregularities on the workpiece surfaces. The echoes or "pips" which are of interest, for example the obstacle "pip" EX, will all appear between the surface entry echo EE and the surface echo EF, the space between the latter echoes corresponding to the thickness of the workpiece. Thus the entire thickness of the workpiece and any weld contained therein is subject to examination. In a modification, the workpiece volume to be examined is swept by waves after reflection at the far surface of the workpiece. In this case, it will be understood that the pattern on the workpiece surface of the prints of ultrasonic wave transmission into the workpiece may not, as in FIGURE 5, cross the weld surface but may lie wholly to one side thereof. However, in the examination system described, the workpiece volume to be examined is swept by direct waves before reflection and "pips" following the far surface echo are not used. An additional "pip" EL, corresponding to a parasite wave in the liquid, may appear subsequent to the echo EF. For purposes of examination, the useful part of the oscilloscope screen 12A may be pointed out by a rectangle PU as indicated in FIGURE 4.

The search for faults is effected by means of a double exploratory movement of the carriage 33 comprising the alternate transverse sweeping movement of the carriage 33 on its bars 31 and 32 which are oriented perpendicularly to the axis of the weld being inspected, and the slow displacement of the carriage 20 on its guides 17 and 19. As shown for example in FIGURE 5, the probe 47 thus describes a to-and-fro movement progressing in the longitudinal direction of the weld 50A. The amplitude A of the alternate transverse sweeping movement is regulated as to explore the entire weld 50A. The longitudinal advance B is preferably effected at the end of each transverse sweep (each semi-alteration in the transverse direction) so that the transverse sweeping movements, having regard to the width of the beam, are in substantially parallel relationship one to the other.

In order to periodically check the functioning of the above described equipment, a standardizing block SA (FIG. 6A), having manufactured discontinuities or flaws therein, may be used. FIGURE 6B shows examples of the marks made by the recorder 14 on the recorder paper 14A in detecting the discontinuities in block SA, and FIGURE 6C shows the corresponding aspects of the oscilloscope screen 12A.

The block SA is a rectangular block of metal having a thickness of 25 mm. (in the direction perpendicular to the plane of the figure) and a depth of 120 mm. Transverse cylindrical holes of a diameter of 1.5 mm., are drilled through the block SA at different depths, i.e., hole A1 at 50 mm., hole A3 at 5 mm., hole A4 at 2 mm., and hole A44 at 118 mm. The block SA is fixed above the sweeping carriage 33 so that the probe 47 can move alternately along its lower side, the longitudinal advance (of carriage 20) being stopped for purpose of this demonstration or check.

The amplification of the transmitter-receiver 12 and its correction with respect to depth is pre-adjusted to obtain a given amplitude of echo ("pip") on two holes of different depths, for example holes A1 and A3. By then starting the automatic sweeping movement of the probe 47 and the recorder 14, a record is made of the echoes with various adjustments on the monitor 13 being made to select the range of depth desired to be examined. Thus, in FIGURES 6B and 6C, from bottom to top, with a crenelation C1 covering the whole of the depth of the block SA (a selection made on the monitor 13 to examine the block SA throughout its depth), the total registration of echoes E1, E3, E4 and E44 (the latter two being interposed one on the other) appears corresponding respectively to the holes A1, A3, A4 and A44, as well as an echo E2 from the upper corner A2 of the block SA. With a crenelation C2 covering approximately the first 10 mm. of the depth, only the echoes E3 and E4 are retained on the next series of sweeps of the probe 47. When the operator elects to examine the median zone (crenelation C3) of the depth of the block SA, the echo E1 is isolated; moreover, with a crenelation C4 covering the uppermost zone of the block SA, the echoes E2 and E44 are separated from the remaining echoes. Thus it can be seen that all flaws in the workpiece (block SA) can be isolated and inspected, with a record of the inspection being made on the recorder paper 14A. It should be noted that each lateral set of marks on the paper 14A represents a single sweep of the probe 47 across the block SA.

Figure 5:
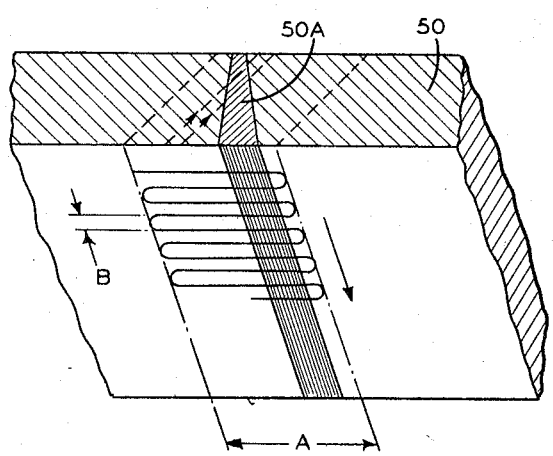
FIGURE 5 is a diagram of the sweeping movements utilized to explore a weld.

In actual practice, on an extensive workpiece, the mechanism would be set to automatically pass the probe 47 along the workpiece 50 in a path similar to that shown in FIGURE 5. For automatic sweeping, a crenelation would be set to search the full depth of the workpiece 50. The operation may be continued until the whole weld has been examined and the recording paper marked or unmarked by echo signals will constitute an inspection record. Any marks on the paper indicating a flaw will indicate the location of such flaw, which may be further located as regards depth by other means or by bringing the probe back to the appropriate position for searching for the flaw by adjusting the monitor 13 for different depth selections or crenelation. Alternatively, upon the detection of a flaw, the mechanism could be arranged to either stop or sound an appropriate alarm. The operator would then, having recognized the presence of a flaw, reexamine the area in which the flaw is present, using the monitor 13 to select various depth ranges (represented by crenelations on the oscilloscope screen 12A) so that the depth of the flaw can be determined.

In FIGURE 6B, it should be noted that there are two marginal lines P1 and P2 along opposite sides of the paper 14A. These inscriptions, representing minor parasite waves caused by the reversals of the probe 47 at the end of each sweep, are advantageously retained since they constitute the marginal limits of the swept zone and supply a constant proof of the correct operation of the recorder 14. Moreover, any disturbance in the column of water between the probe 47 and the workpiece 50, even if local and momentary, causes the formation of a parasite echo which will be recorded and easily detected.

Each line on the paper 14A, representing an obstacle, is made up of a set of very closely spaced points each point corresponding to an echo from the obstacle. The frequency of inscription of the points, independent of the speed of sweeping, is the same as the frequency of the emission of groups of ultrasonic pulses or waves from the probe 47, thus completing the recording of the total pertinent information.

FIGURES 7A, 7B and 7C shows another example of the exploration of a test block SB having known artificial faults. The block SB has a series of holes, B10, B30, B50, B70, B90 and B100 drilled at depths of values in millimeters equal to their respective indices and situated in separate planes parallel to the plane of FIGURE 7A. An extension block SC is engaged with the end of block SB having the holes drilled therein.

The block SB is explored with an alternate sweeping movement effected between the two portions b1 and b2, and with a longitudinal advance displacing the plane of sweeping perpendicularly to the plane of FIGURE 7A so as to successively encounter the holes B10, B30, B50, B90 and B100. Clearly distinguishable on the record paper 14A are the marks E10, E30, E70, E90 and E100 corresponding to the various holes having the same suffixes, and the continuous markings E1 and E2 corresponding respectively to the lower and upper corners B1 and B2 of the block SB. Also to be noted are the markings P1 and P2 representing the limits of sweep, which result at the ends of the sweep by reason of the electrical and mechanical disturbances arising when the direction of sweep motor rotation comes to be automatically reversed; such markings give a record of the sweep movement and a check on the operation of the marking system.

In the application of the above disclosed device to real tests, a system is employed for automatically marking the recorder paper 14A in relation to the workpiece being examined so that a mark on the paper 11A can be related more immediately to the location of the corresponding obstacle or flaw in the workpiece. To accomplish this, a series of electrical contacts (not shown) is applied magnetically or otherwise to the area of the workpiece, being inspected. As the probe 47 is swept over the workpiece, these contacts engage a pick-up element (not shown) on the carriage 33 and transmit a signal to the recorder 14, thus reproducing on the paper 14A an index of the transverse sweep and longitudinal advances of the probe 47. Alternatively, the dish frame 14 may have contacts (not shown) attached thereto which when they impinge upon each of a series of stationary abutments such as pot magnets placed on the workpiece surface in a row along a side or both sides of the area over which the dish frame sweeps will close and send a signal to the recorder 14.

It should be recognized that the above disclosed ultrasonic testing device may be adapted for use on workpieces of many shapes. If the workpiece has a curved surface, the fact that the contact is maintained through a meniscus allows considerable play between the tube 46 and the workpiece so that the differences in elevation due to the curvature of the workpiece surface can normally be accommodated without vertical movements of the testing apparatus. In certain instances, it may also be advantageous to eliminate the longitudinal advance of the probe 47 and replace it with an equivalent movement of the workpiece itself.

The recording process described is advantageous because of its simplicity of interpretation; however, it may be modified to supply any other indication which may be considered useful (height or depth of echoes, etc.), either by adding other inscription means (pens) on the same recorder, or by additional recorders. For example, an ink marker or pen may be arranged in contact with the recording paper to a side of the area thereof capable of being marked as already described, which normally is stationary but which is arranged to make, laterally of the direction of paper movement, a swing related to the amplitude of each amplified echo response, whereby on the ultrasonic inspection record provided by the recording paper, in the case of a number of flaws having been recorded, the flaw producing the largest echo may be immediately picked out and its location along the region examined established.

The apparatus makes by the movement of the recording paper in the appliance 14 a record of the probe means movement longitudinally of the workpiece region examined, which is further made plain by the advancing of the markings P1 and P2 on the paper and if desired by markings due to the use of the described fixed contacts or fixed abutments arranged in a row or rows along the workpiece and contacted by a reciprocating part of the apparatus. The apparatus also makes by the movement of the paper and the markings P1 and P2 made alternately at the ends of the sweep a second record, correlated with the first record, of the probe means reciprocatory movement. The apparatus also makes a third record, correlated with the first and second records, of the receipt by the probe means of ultrasonic echoes from the workpiece region examined.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. Apparatus for ultrasonically testing a workpiece comprising a probe assembly disposed beneath the workpiece, said probe assembly including an upright tubular member defining a liquid chamber, the longitudinal axis of said chamber being inclined at a predetermined angle with respect to a line normal to the adjacent workpiece surface, crystal means disposed at the lower end of said chamber and being oriented and adapted to transmit and receive ultrasonic waves respectively to and from said workpiece along the axis of said chamber, the upper end of said tubular member being beveled at an angle complementary to said predetermined angle, means for maintaining the upper beveled end of said tubular member at a slight distance from said workpiece, and means for supplying liquid to said chamber to effect a continuous flow of said liquid over the upper end of said tubular member, said slight distance being such that a meniscus of said liquid is formed by capillarity to extend between the upper end of said tubular member and the adjacent surface of said workpiece, whereby a stable column of liquid is continuously maintained between said crystal means and said workpiece, said predetermined angle being based on the desired amount of refraction of said waves occuring at the interface of said liquid and said workpiece, and means for moving the probe assembly over the area of the workpiece to be tested.

2. Apparatus for ultrasonically testing a workpiece comprising a probe assembly disposed beneath the workpiece, said probe assembly including an upright tubular member defining a substantially cylindrical liquid chamber, the longitudinal axis of said chamber being inclined at a predetermined angle with respect to a line normal to the adjacent workpiece surface, crystal means disposed at the lower end of said chamber and being oriented and adapted to transmit and receive ultrasonic waves respectively to and from said workpiece along the axis of said chamber, the upper end of said tubular member being beveled at an angle complementary to said predetermined angle, means engaged with said workpiece for maintaining the upper beveled end of said tubular member at a slight distance from said workpiece, means for supplying liquid to said chamber to effect a continuous flow of said liquid over the upper end of said tubular member, and means circumferentially arranged around the upper end of said tubular member for collecting the overflow of said liquid, said slight distance being such that a meniscus of said liquid is formed by capillarity to extend between the upper end of said tubular member and the adjacent surface of said workpiece, whereby a stable column of liquid is continuously maintained between said crystal means and said workpiece, and means for moving the probe assembly over the area of the workpiece to be tested.

3. Apparatus according to claim 1 for ultrasonically testing an elongated butt weld in a workpiece, wherein said probe is positioned adjacent said workpiece with said crystal means adapted for transmitting and receiving ultrasonic waves respectively to and from said workpiece, and said moving means including means for automatically traversing said weld with said probe, said traversing means comprising means for effecting a series of sweeping movements of said probe in alternately opposite directions substantially perpendicular to the longitudinal axis of said weld, and means for advancing said probe longitudinally in a direction substantially parallel to the axis of said weld at the end of each of said sweeping movements.

4. Apparatus according to claim 3 wherein said traversing and advancing means includes a first set of tracks extending substantially parallel to said weld, a first carriage mounted on said first set of tracks, a drive motor for advancing said first carriage along said first set of tracks, a second set of tracks mounted on said first carriage and extending substantially perpendicular to said weld, a second carriage adapted to move along said second set of tracks, said probe being mounted on said second carriage, and a reversible drive system for moving said second carriage along said second set of tracks.

5. Apparatus according to claim 3 wherein said means for automatically traversing said weld with said probe further includes means for effecting a series of sweeping movements of said probe in alternately opposite directions substantially perpendicular to the longitudinal axis of said weld and for advancing said probe longitudinally in a direction substantially parallel to the axis of said weld at the end of each of said sweeping movements, said last named means including a first set of tracks extending substantially parallel to said weld, a first carriage mounted on said first set of tracks, a drive motor for advancing said first carriage along the first set of tracks, a second set of tracks mounted on said first carriage and extending substantially perpendicular to said weld, a second carriage adapted to move along said second set of tracks, said probe being mounted on said second carriage, a reversible drive system for moving said second carriage along said second set of tracks, and means for coordinating operation of said drive motor and said reversible drive system.

6. Apparatus according to claim 1 and further including a recorder operatively associated with said probe and said moving means for producing a record of said echoes, said recorder including a sheet of recording material, a marker adapted to inscribe marks on said recorder material representing said echoes, and means for effecting relative movement of said marker and said recorder material in response to the movements of said probe so that said marker traces a path over said recorder material which proportionally corresponds to the pattern of movement of said probe relative to said workpiece.

7. Apparatus according to claim 1 wherein said moving means includes a traversing system for automatically passing said probe over said weld in a regular pattern comprising means for effecting a series of transverse sweeping movements of said probe in alternately opposite directions across the longitudinal axis of said weld and for advancing said probe longitudinally in a direction parallel to the axis of said weld, and further including a recorder operatively associated with said probe and said traversing system for producing a record of said echoes, said recorder including a marker, a sheet of recorder material, means for advancing said recorder material in response to and to proportionally correspond with the longitudinal advancement of said probe, and means for effecting transverse movements of the marker relative to the recorder material in response to and to proportionally correspond with the sweeping transverse movements of said probe.

8. Apparatus according to claim 1 wherein said moving means further includes a traversing system for automatically passing said probe over said weld in a regular pattern comprising means for effecting a series of transverse sweeping movements of said probe in alternately opposite directions substantially perpendicular to the longitudinal axis of said weld and for advancing said probe longitudinally in a direction substantially parallel to the axis of said weld at the end of each of said sweeping movements, and further including a recorder operatively associated with said probe and said traversing system for producing a record of said echoes, said record being indexed to correspond to locations on said workpiece, said recorder including a sheet of recorder material, a marker adapted to inscribe marks on said recorder material, said marks being representative of said echoes, means for advancing said recorder material in response to and to proportionally correspond with the longitudinal advancement of said probe, and means for effecting transverse movements of the marker relative to the recorder material in response to and to proportionally correspond with the transverse sweeping movements of said probe.

9. Apparatus according to claim 1 wherein said crystal means transmits ultrasonic waves into said workpiece at a predetermined frequency and receives echoes of said waves from said workpiece, said moving means including a traversing system for automatically passing said probe over said weld in a regular pattern comprising means for effecting a series of transverse sweeping movements of said probe in alternately opposite directions across the longitudinal axis of said weld and for advancing said probe longitudinally in a direction parallel to the axis of said weld, and further including a recorder operatively associated with said probe and said traversing system for producing a record of said echoes, said recorder including a sheet of recorder material, a marker adapted to inscribe marks on said recorder material, means for effecting relative movement of said marker and said recorder material in response to the movements of said probe so that said marker traces a path over said recorder material which proportionally corresponds to the pattern of movement of said probe relative to said workpiece, the frequency of marks made by said recorder being equal to the frequency of waves transmitted by said crystal, and means for actuating said marker in response to the changes in transverse direction of said probe to inscribe on said recorder material boundary limits corresponding to the limits of transverse movement of said probe.

10. Apparatus for ultrasonically testing an elongated butt weld in a workpiece comprising a probe disposed beneath the workpiece, said probe including an upright tubular member defining a liquid chamber, crystal means disposed at the lower end of said chamber for transmitting ultrasonic waves along the axis of said chamber into said workpiece and receiving echoes of said waves from said workpiece, means engaged with said workpiece for maintaining the upper end of said tubular member at a slight distance from said workpiece, and means for supplying liquid to said chamber to effect a continuous flow of said liquid over the upper end of said tubular member, said slight distance being such that a meniscus of said liquid is formed by capillarity to extend between the upper end of said tubular member and the adjacent surface of said workpiece, whereby a stable column of said liquid is continuously maintained between said crystal means and said workpiece, a traversing system for automatically passing said probe over said weld in a regular pattern comprising means for effecting a series of sweeping transverse movements of said probe in alternate opposite directions across the longitudinal axis of said weld and for advancing said probe longitudinally in a direction parallel to the axis of said weld, and a recorder operatively associated with said probe and said traversing system for producing a record of said echoes, said record being indexed to correspond to positions along the path of travel of said probe.

11. Apparatus for ultrasonically testing an elongated butt weld in a workpiece comprising a probe disposed beneath the workpiece, said probe including an upright tubular member defining a liquid chamber, the longitudinal axis of said liquid chamber being inclined at a predetermined angle with respect to a line normal to the adjacent workpiece surface, the upper end of said tubular member being beveled at an angle complementary to said predetermined angle, crystal means disposed at the lower end of said chamber for transmitting ultrasonic waves along the axis of said chamber into said workpiece and receiving echoes of said waves from said workpiece, means engaged with said workpiece for maintaining the upper beveled end of said tubular member at a slight distance from said workpiece, and means for supplying liquid to said chamber to effect a continuous flow of said liquid over the upper end of said tubular member, said slight distance being such that a meniscus of said liquid is formed by capillarity to extend between the upper end of said tubular member and the adjacent surface of said workpiece, whereby a stable column of said liquid is continuously maintained between said crystal means and said workpiece, a traversing system for automatically passing said probe over said weld in a regular pattern comprising means for effecting a series of transverse sweeping movements of said member in alternate opposite directions substantially perpendicular to the longitudinal axis of said weld and for advancing said probe longitudinally in a direction substantially parallel to the axis of said weld at the end of each of said transverse sweeping movements, and a recorder operatively associated with said probe and said traversing system for producing a record of said echoes, said recorder including a sheet of recorder material, a marker adapted to inscribe marks on said recorder material, and means for effecting relative movement of said marker and said recorder material in response to the movements of said probe so that said marker traces a path over said recorder material which proportionally corresponds to the path of said probe relative to said workpiece.

12. Apparatus according to claim 11 wherein the means for effecting transverse sweeping movements and for advancing said probe includes a first set of tracks extending substantially parallel to said weld, a first carriage mounted on said first set of tracks, a drive motor for advancing said first carriage along said first set of tracks, a second set of tracks mounted on said first carriage and extending substantially perpendicularly to said weld, a second carriage adapted to move along said second set of tracks, said probe being mounted on said second carriage, and a reversible drive system for moving said second carriage along said second set of tracks.

13. Apparatus according to claim 12, with said recorder being indexed to correspond to physical locations on said workpiece, said marks being representative of said echoes, said means for effecting relative movement of said marker including means for advancing said recorder material in response to and to proportionally correspond with the longitudinal advancement of said probe, and means for effecting transverse movements of said marker relative to said recorder material in response to and to proportionally correspond with the transverse sweeping movements of said probe.

References Cited

UNITED STATES PATENTS

| | | | |
|---|---|---|---|
| 2,505,867 | 5/1950 | Meunier | 73—67.6 |
| 2,740,289 | 4/1956 | Van Valkenburg et al. | 73—67.9 |
| 2,969,671 | 1/1961 | Sproule | 73—67.9 |
| 3,036,151 | 5/1962 | Mitchell et al. | 73—67.9 X |
| 3,129,581 | 4/1964 | Bande | 73—67.8 |
| 3,159,756 | 12/1964 | Beaujard et al. | 73—67.8 X |
| 3,178,933 | 4/1965 | Bloch et al. | 73—67.8 |

OTHER REFERENCES

Curtiss-Wright Ultrasonic Testing Systems, Manufacturers Bulletin, Curtiss-Wright Corp., Electronics Division, 35 Market St., East Paternson, N.J., pages 1, 2 and 3.

RICHARD C. QUEISSER, *Primary Examiner.*

JOHN P. BEAUCHAMP, *Examiner.*